United States Patent
Yanagihara

(10) Patent No.: US 10,921,683 B2
(45) Date of Patent: Feb. 16, 2021

(54) OPTICAL DEVICE, METHOD FOR CONTROLLING OPTICAL DEVICE, AND IMAGE DISPLAY APPARATUS

(71) Applicant: SEIKO EPSON CORPORATION, Tokyo (JP)

(72) Inventor: Daisuke Yanagihara, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/881,160

(22) Filed: May 22, 2020

(65) Prior Publication Data

US 2020/0371405 A1 Nov. 26, 2020

(30) Foreign Application Priority Data

May 23, 2019 (JP) .................................. 2019-096737

(51) Int. Cl.
| | |
|---|---|
| *G03B 21/14* | (2006.01) |
| *H04N 9/31* | (2006.01) |
| *G03B 5/00* | (2006.01) |
| *G03B 5/06* | (2021.01) |
| *G03B 33/12* | (2006.01) |
| *G03B 21/00* | (2006.01) |

(52) U.S. Cl.
CPC ............. *G03B 5/06* (2013.01); *G03B 21/142* (2013.01); *H04N 9/3105* (2013.01); *H04N 9/3197* (2013.01); *G03B 21/006* (2013.01); *G03B 33/12* (2013.01)

(58) Field of Classification Search
CPC ........ G03B 21/14; G03B 21/142; G03B 5/06; G03B 5/00; G02F 1/29; H04N 9/3105; H04N 9/3197
See application file for complete search history.

(56) References Cited

U.S. PATENT DOCUMENTS

| | | | |
|---|---|---|---|
| 9,519,134 B2 * | 12/2016 | Hino ................... | G02B 26/0816 |
| 9,602,790 B2 * | 3/2017 | Mizoguchi ........... | H04N 9/3129 |
| 9,651,773 B2 * | 5/2017 | Mizoguchi ........... | G03B 21/006 |
| 9,664,980 B2 | 5/2017 | Mizoguchi et al. | |
| 9,823,553 B2 * | 11/2017 | Mizoguchi ........... | H04N 9/3135 |
| 9,860,499 B2 * | 1/2018 | Mizoguchi ......... | G02B 27/0905 |
| 9,952,425 B2 * | 4/2018 | Kojima ................ | G02B 26/085 |

(Continued)

FOREIGN PATENT DOCUMENTS

| | | |
|---|---|---|
| JP | 2002-250970 A | 9/2002 |
| JP | 2011-158589 A | 8/2011 |

(Continued)

*Primary Examiner* — William C. Dowling
(74) *Attorney, Agent, or Firm* — Oliff PLC

(57) ABSTRACT

A method for controlling an optical device including a movable section including an optical section that refracts incident video image light in accordance with the angle of incidence of the video image light and outputs the refracted video image light and a holding section that supports the optical section, an actuator that causes the movable section to swing, and a drive circuit that applies a drive signal to the actuator via a coupling capacitor and an amplifier, the method including applying voltage that is intermediate potential for a first period and then applying a trapezoidal wave having an upper base corresponding to second voltage and a lower base corresponding to third voltage.

6 Claims, 9 Drawing Sheets

(56) References Cited

U.S. PATENT DOCUMENTS

| | | | | |
|---|---|---|---|---|
| 10,634,903 | B2* | 4/2020 | Mizoguchi | G02B 27/0176 |
| 2016/0091773 | A1* | 3/2016 | Mizoguchi | G02F 1/29 |
| | | | | 359/199.3 |
| 2016/0227176 | A1* | 8/2016 | Mizoguchi | G02B 27/0176 |
| 2016/0363841 | A1* | 12/2016 | Hino | G09G 3/007 |
| 2018/0047321 | A1 | 2/2018 | Hirakura | |
| 2020/0159093 | A1* | 5/2020 | Wakabayashi | G01D 3/0365 |
| 2020/0159094 | A1* | 5/2020 | Wakabayashi | H02K 11/215 |

FOREIGN PATENT DOCUMENTS

| | | |
|---|---|---|
| JP | 2016-071232 A | 5/2016 |
| JP | 2016-186557 A | 10/2016 |

* cited by examiner

OPTICAL DEVICE, METHOD FOR CONTROLLING OPTICAL DEVICE, AND IMAGE DISPLAY APPARATUS

The present application is based on, and claims priority from JP Application Serial Number 2019-096737, filed May 23, 2019, the disclosure of which is hereby incorporated by reference herein in its entirety.

BACKGROUND

1. Technical Field

The present disclosure relates to an optical device, a method for controlling the optical device, and an image display apparatus including the optical device.

2. Related Art

To increase the resolution of a projected image as compared with the resolution of a light modulator, such as a liquid crystal panel, there has been a known technology for shifting the axis of video image light outputted from the light modulator.

For example, in the projection-type display apparatus described in JP-A-2011-158589, an optical path changing plate for shifting the optical axis of video image light by half the size of a pixel is provided. In detail, the projection-type display apparatus is so driven and controlled that a state in which the optical path changing plate inclines by a predetermined angle toward the positive side and a state in which the optical path changing plate inclines by a predetermined angle toward the negative side are alternately iterated to increase the resolution of a projected image. In this process, to ensure the quality of the image, it is necessary to prolong the period for which the positive and negative predetermined angle inclination states are maintained, so that a drive signal for driving the optical path changing plate is skillfully designed in JP-A-2011-158589. In detail, the polarity of current is changed from positive to negative and vice versa by using a sinusoidal wave as the waveform of portions of the drive signal that are the portions where low potential is switched to high potential and vice versa (see FIG. 8). It is speculated from the waveform diagram of FIG. 8 that the high-potential maximum amplitude of the sinusoidal wave is used as the reference potential of the drive signal.

In the drive method described in JP-A-2011-158589, however, the sinusoidal wave portions cause the optical path changing plate to swing to the side opposite the intended side for an instant, resulting in a problem of blurred video image light. In view of the problem, the present inventors have proposed that a trapezoidal wave is used as the drive signal, as in the image display apparatus described in JP-A-2016-71232. The proposed method does not cause the change in the polarity, positive or negative, when low potential is switched to high potential and vice versa.

Using the drive signal formed of a trapezoidal wave shown in JP-A-2016-71232 allows generation of a less-blurred, higher-quality image than an image generated by the drive signal shown in JP-A-2011-158589, but the reference potential of the drive signal has not been taken into consideration.

For example, when a high-potential-reference drive signal is used, as in JP-A-2011-158589, to amplify the signal from the waveform generation circuit including a D/A converter with an amplifier, the operation of the optical path changing plate is undesirably biased by DC bias during a transient response period resulting from a coupling capacitor on the upstream of the amplifier and the input impedance of the amplifier. The phenomenon also occurs when a drive signal formed of a trapezoidal wave is used, the biased operation of the optical path changing plate causes a problem of degradation in image quality.

SUMMARY

A method for controlling an optical device according to the present application is a method for controlling an optical device including a movable section including an optical section that refracts incident video image light in accordance with an angle of incidence of the video image light and outputs the refracted video image light and a holding section that supports the optical section, an actuator that causes the movable section to swing, and a drive circuit that applies a drive signal to the actuator via a coupling capacitor and an amplifier, the method including applying first voltage to the actuator for a first period and then periodically applying second voltage and third voltage to the actuator to cause the movable section to swing. The second voltage is a maximum of the voltage applied during causing the movable section to swing. The third voltage is a minimum of the voltage applied during causing the movable section to swing. The first voltage is intermediate voltage between the second voltage and the third voltage.

In the method for controlling an optical device described above, the first period may be at least three times a time constant $\tau$, where $\tau$ is a time constant determined by a capacity of the coupling capacitor and resistance including input impedance of the amplifier.

In the method for controlling an optical device described above, the first voltage may be applied to the actuator after the operation of driving the actuator based on the drive signal is completed or in a drive standby state in which the actuator is ready to be driven.

In the method for controlling an optical device described above, a signal waveform periodically applied to the actuator may be a waveform of a trapezoidal wave having an upper base corresponding to the second voltage and a lower base corresponding to the third voltage.

An optical device according to the present application includes a movable section including an optical section that refracts incident video image light in accordance with an angle of incidence of the video image light and outputs the refracted video image light and a holding section that supports the optical section, an actuator that causes the movable section to swing, and a drive circuit that applies a drive signal to the actuator. The drive circuit applies the drive signal to the actuator via a coupling capacitor and an amplifier. The drive circuit applies first voltage to the actuator for a first period and then periodically applies second voltage and third voltage to the actuator to cause the movable section to swing. The second voltage is a maximum of the voltage applied during causing the movable section to swing. The third voltage is a minimum of the voltage applied during causing the movable section to swing. The first voltage is intermediate voltage between the second voltage and the third voltage.

An image display apparatus according to the present application includes the optical device described above and a projection optical system that enlarges and projects the video image light outputted from the optical device.

DESCRIPTION OF EXEMPLARY EMBODIMENTS

An embodiment of the present disclosure will be described below with reference to the drawings. In the following drawings, each layer and each portion are so drawn at scales different from actual scales as to be large enough to be recognizable on the drawings.

EMBODIMENT

1) Overview of Projector

Figure 1:
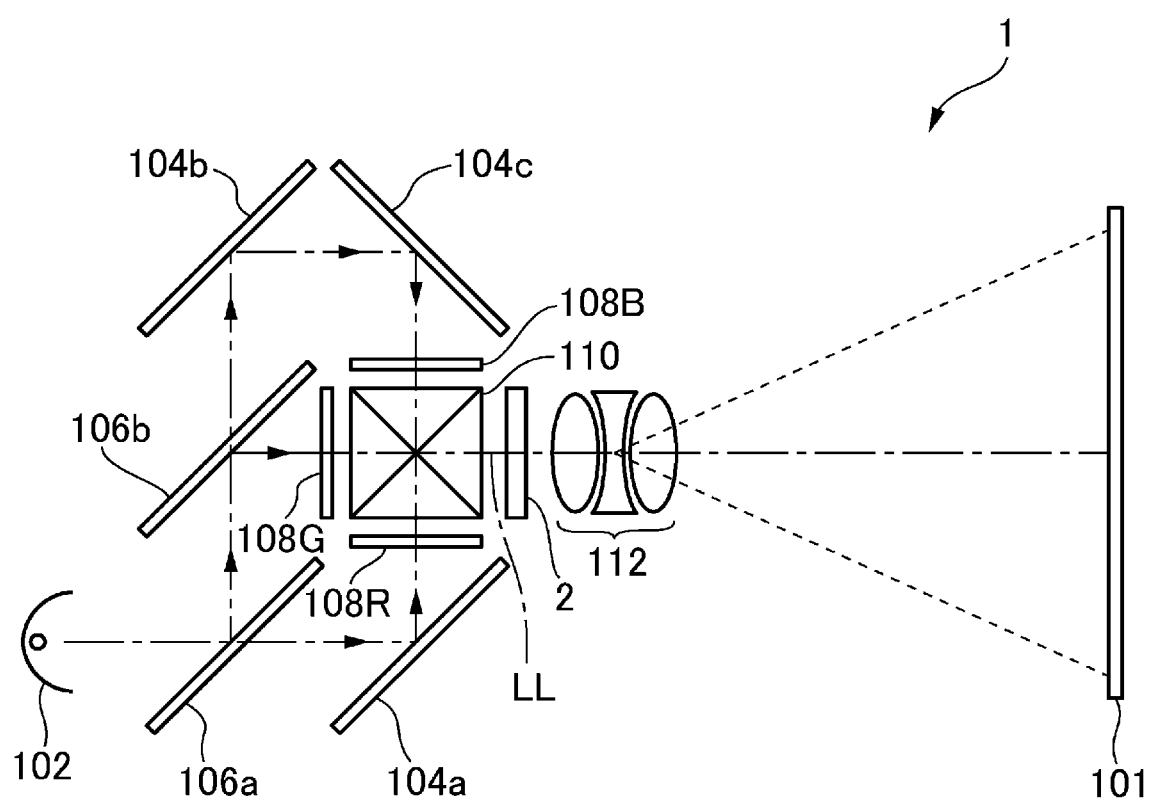
FIG. 1 is a schematic configuration diagram of a projector according to an embodiment.

FIG. 1 is a descriptive diagram showing the optical configuration of a projector according to the present embodiment. The configuration of a projector 1 according to the present embodiment will first be described.

The projector 1 as an image display apparatus is an LCD-based projector. The projector 1 is an apparatus that displays video images on a screen 101 based on an externally inputted video signal. The projector 1 is formed of a light source 102, mirrors 104a, 104b, and 104c, dichroic mirrors 106a and 106b, liquid crystal display elements 108R, 108G, and 108B, a dichroic prism 110, an optical path shifting device 2, a projection optical system 112, and other components.

Examples of the light source 102 may include a halogen lamp, a mercury lamp, a light emitting diode (LED), and a laser light source. The light source 102 is a light source that outputs white light. The light outputted from the light source 102 is separated by the dichroic mirror 106a, for example, into red light (R) and other light. The red light is reflected off the mirror 104a and then incident on the liquid crystal display element 108R. The other light is further separated by the dichroic mirror 106b into green light (G) and blue light (B). The green light is reflected off the dichroic mirror 106b and then incident on the liquid crystal display element 108G. The blue light passes through the dichroic mirror 106b, is then reflected off the mirrors 104b and 104c, and is then incident on the liquid crystal display element 108B.

The liquid crystal display elements 108R, 108G, and 108B are each used as a spatial light modulator. The liquid crystal display elements 108R, 108G, and 108B are transmissive spatial light modulators corresponding to the three primary colors of light, R, G, and B, and each include pixels arranged in a matrix formed, for example, of 1080 vertically arranged rows and 1920 horizontally arranged columns. The pixels each adjust the amount of light that passes through the pixel with respect to the amount of light incident on the pixel, and the liquid crystal display elements 108R, 108G, and 108B cooperatively control the distribution of the amounts of light over the entire pixels. The light fluxes spatially modulated by the thus configured liquid crystal display elements 108R, 108G, and 108B are combined with one another by the dichroic prism 110, and the combined light is outputted as full-color video image light LL from the dichroic prism 110. The outputted video image light LL travels via the optical path shifting device 2, is enlarged by the projection optical system 112, and is projected by the projection optical system 112 onto the screen 101.

The optical path shifting device 2 as an optical device is disposed between the dichroic prism 110 and the projection optical system 112. In the projector 1, the optical path shifting device 2 shifts the optical path of the video image light LL in accordance with the angle of incidence thereof, and an image having resolution higher than the resolution of the liquid crystal display elements 108R, 108G, and 108B is projected on the screen 101. For example, when the liquid crystal display elements 108R, 108G, and 108B are each a full-high-vision display element, a 4K image is displayed. The optical path shift is also called "pixel shift."

2) Overview of Pixel Shift

Figure 2:
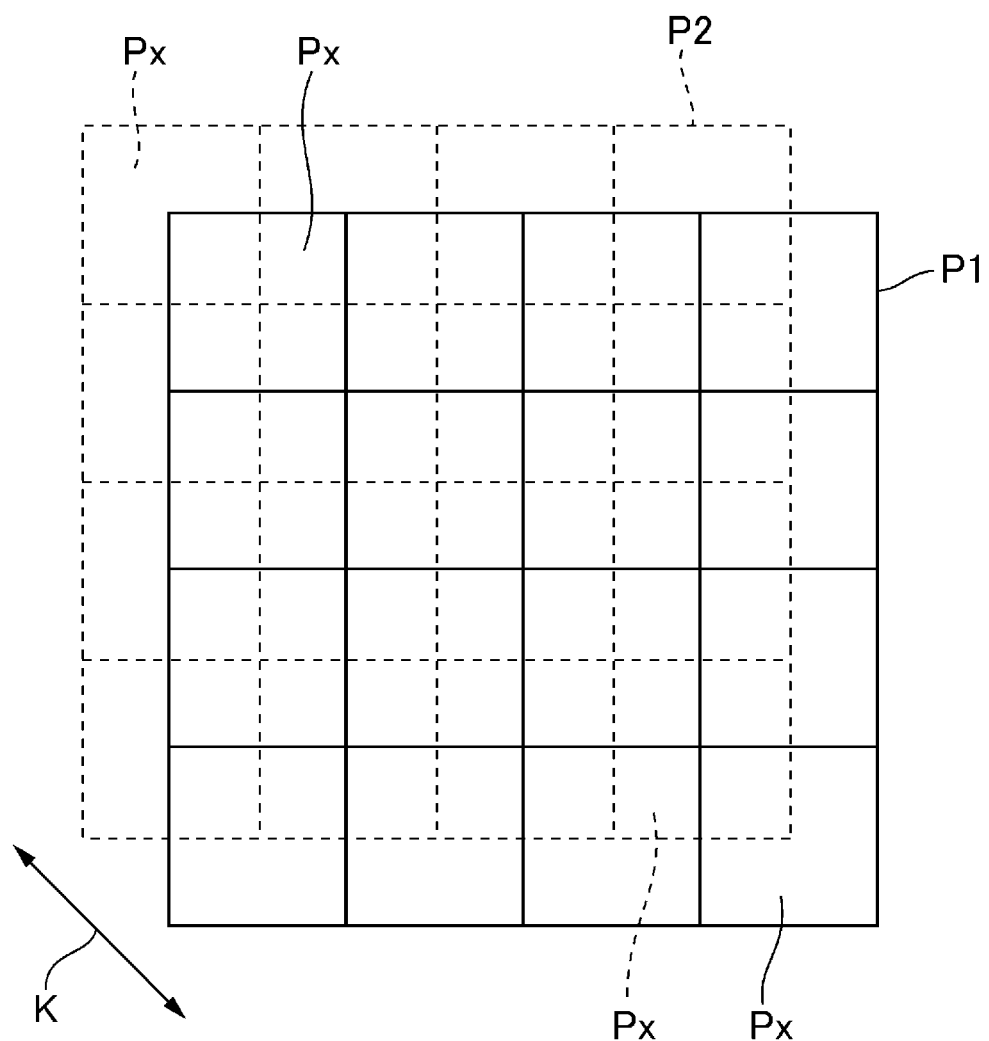
FIG. 2 shows a state in which an image display position is shifted by video image light pixel shift.

FIG. 2 shows a state in which an image display position is shifted by the video image light pixel shift.

The principle of the increase in resolution based on the pixel shift will be described with reference to FIG. 2.

The optical path shifting device 2 includes an optical path changing plate 30 (FIG. 5) as an optical section that transmits the video image light LL and changes the attitude of the optical path changing plate 30, which is a light-transmissive plate-shaped member, to shift the optical path of the video image light LL by using refraction thereof.

The projector 1 uses the optical path shift described above to alternately display an image in an image display position P1 where the optical path of the video image light LL is shifted to one side and an image display position P2 where the optical path of the video image light LL is shifted to the other side. The image display positions P1 and P2 are positions shifted from each other by a half pixel in a diagonal direction K of pixels Px on the screen 101. The half pixel refers to one half of each of the pixels Px. The pixel shift described above allows an increase in the apparent number of pixels, whereby the resolution of the image projected on the screen 101 can be increased. The amount of shift between the image display positions P1 and P2 is not limited to the half pixel and may, for example, be one-fourth or three-fourths of each of the pixels Px. Further, the pixels are not necessarily shifted in an oblique direction and may instead be shifted in the upward or downward direction or the rightward or leftward direction. Even when the pixels are shifted in the upward, downward, rightward, or leftward direction, the resolution of a projected image can be increased.

3) Circuit Block Configuration

Figure 3:
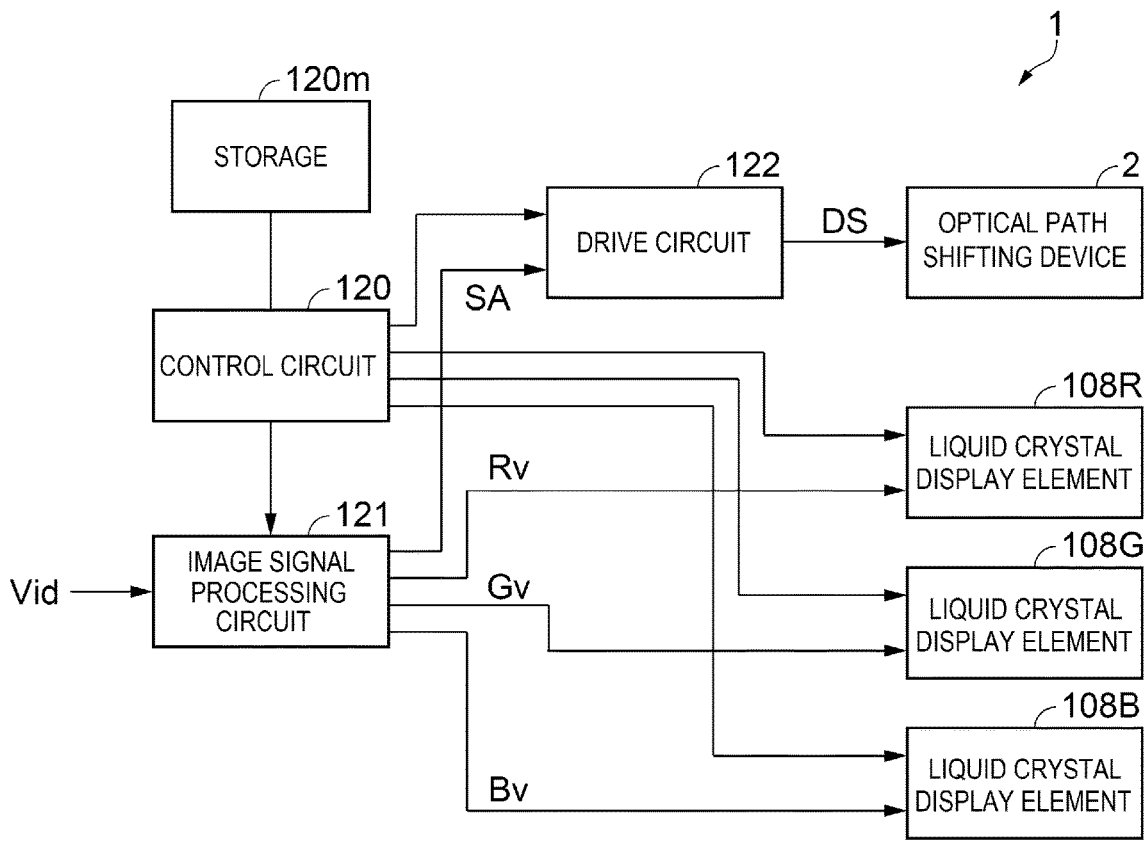
FIG. 3 is a circuit block diagram showing the electrical configuration of the projector.

FIG. 3 is a circuit block diagram showing the electrical configuration of the projector.

The projector 1 is formed of a control circuit 120, an image signal processing circuit 121, a drive circuit 122, and other components.

The control circuit 120 is a micro-controller unit (MCU) and controls the operation of the projector 1 including operation of writing data signals onto the liquid crystal display elements 108R, 108G, and 108B, optical path shift operation performed by the optical path shifting device 2, and data signal generation operation performed by the image signal processing circuit 121. The control circuit 120 accompanies a storage 120m formed, for example, of a nonvolatile memory, a ROM, and a RAM, and the storage 120m stores data on the drive waveform of a drive signal DS, a variety of programs for controlling the operation of the projector 1, and data associated with the programs.

The image signal processing circuit 121 separates an image signal Vid supplied from an external apparatus into R, G, and B signals corresponding to the three primary colors of light and converts the signals into data signals Rv, Gv, and By suitable for the operation of the liquid crystal display elements 108R, 108G, and 108B. The converted data signals Rv, Gv, and By are supplied to the liquid crystal display elements 108R, 108G, and 108B, respectively, and the liquid crystal display elements 108R, 108G, and 108B are so driven as to display images based on the data signals. The image signal processing circuit 121 may be formed of a digital signal processor (DSP), an application specific integrated circuit (ASIC), a programmable logic device (PLD), a field programmable gate array (FPGA), or any other circuit. The drive circuit 122 is a circuit that generates the drive signal DS for driving the optical path shifting device 2. The drive circuit 122 generates the drive signal DS based on a synchronization signal SA inputted from the image signal processing circuit 121 and supplies the drive signal DS to the optical path shifting device 2. The drive circuit 122 may be formed of a digital signal processor (DSP), an application specific integrated circuit (ASIC), a programmable logic device (PLD), a field programmable gate array (FPGA), or any other circuit.

Figure 4:
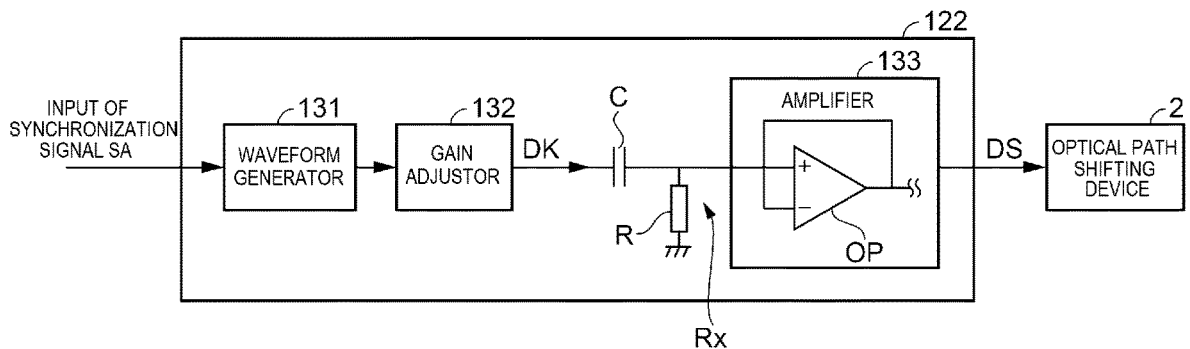
FIG. 4 is a circuit block diagram of a drive circuit.

FIG. 4 is a circuit block diagram of the drive circuit.

The drive circuit 122 includes a waveform generator 131, a gain adjuster 132, an amplifier unit 133, and other components, which generate the drive signal DS and adjust the waveform of the drive signal DS.

The waveform generator 131 includes a D/A converter and generates a trapezoidal drive signal based on the synchronization signal SA, which has a rectangular shape and synchronizes with an image. Specifically, using the synchronization signal SA as a trigger, the D/A converter converts the drive waveform data, which is digital data and is stored in the storage 120m, into an analog signal and outputs the analog signal. Using the D/A converter as described above to change the frequency of a conversion clock allows generation of a desired waveform, such as a trapezoidal wave. In detail, changing the drive waveform data allows generation of a rectangular wave, a sinusoidal wave, a trapezoidal wave, and also the combination thereof. Further, intermediate potential, which will be described below, can also be generated.

The gain adjuster 132 includes a digital potentiometer, which adjusts the amplitude of the trapezoidal signal generated by the waveform generator 131, and outputs the adjusted signal as a drive signal DK. The drive signal DK is a base drive signal that is a pre-amplification model signal. In a preferable example, the gain adjuster 132 includes an I²C bus as an interface and is configured to be capable of electrically changing resistance in accordance with a control signal from the control circuit 120.

An interface circuit is provided between the gain adjustor 132 and the amplifier unit 133. The interface circuit is formed, for example, of a capacitor C and a resistor R. One end of the capacitor C is coupled to an output section of the gain adjustor 132, and the other end of the capacitor C is coupled to an operational amplifier OP, which forms the amplifier unit 133. One end of the resistor R is coupled to the other end of the capacitor C, and the other end of the resistor R is coupled to ground potential.

The amplifier unit 133 includes the operational amplifier OP as an amplifier, which amplifies a signal inputted via the interface circuit, and supplies the amplified signal as the drive signal DS to an actuator 6 in the optical path shifting device 2. The amplifier unit 133 employs, as a preferable example, a non-inversion amplification circuit using the operational amplifier OP and may instead employ any other amplification circuit capable of amplifying the input signal into the drive signal DS.

Now, let R be the resistance of the resistor R and C be the capacity of the capacitor C in the interface circuit, and the time constant τ in the circuit configuration described above is believed to be R×C, which is, however, differs from an actual time constant because in detail the input impedance of the operational amplifier OP needs to be taken into consideration as well as the resistance R.

Therefore, in the present specification, the resistance that determines the time constant is resistance Rx, which is the combination of the resistor R and the input impedance. The following description will therefore be made on the assumption that the time constant τ is Rx×C. The resistance Rx varies on a product basis because parts to be used in a projector varies in accordance with the specifications of the projector, such as the circuit configuration and capacity of the capacitor C.

4) Configuration of Optical Path Shifting Device

Figure 5:
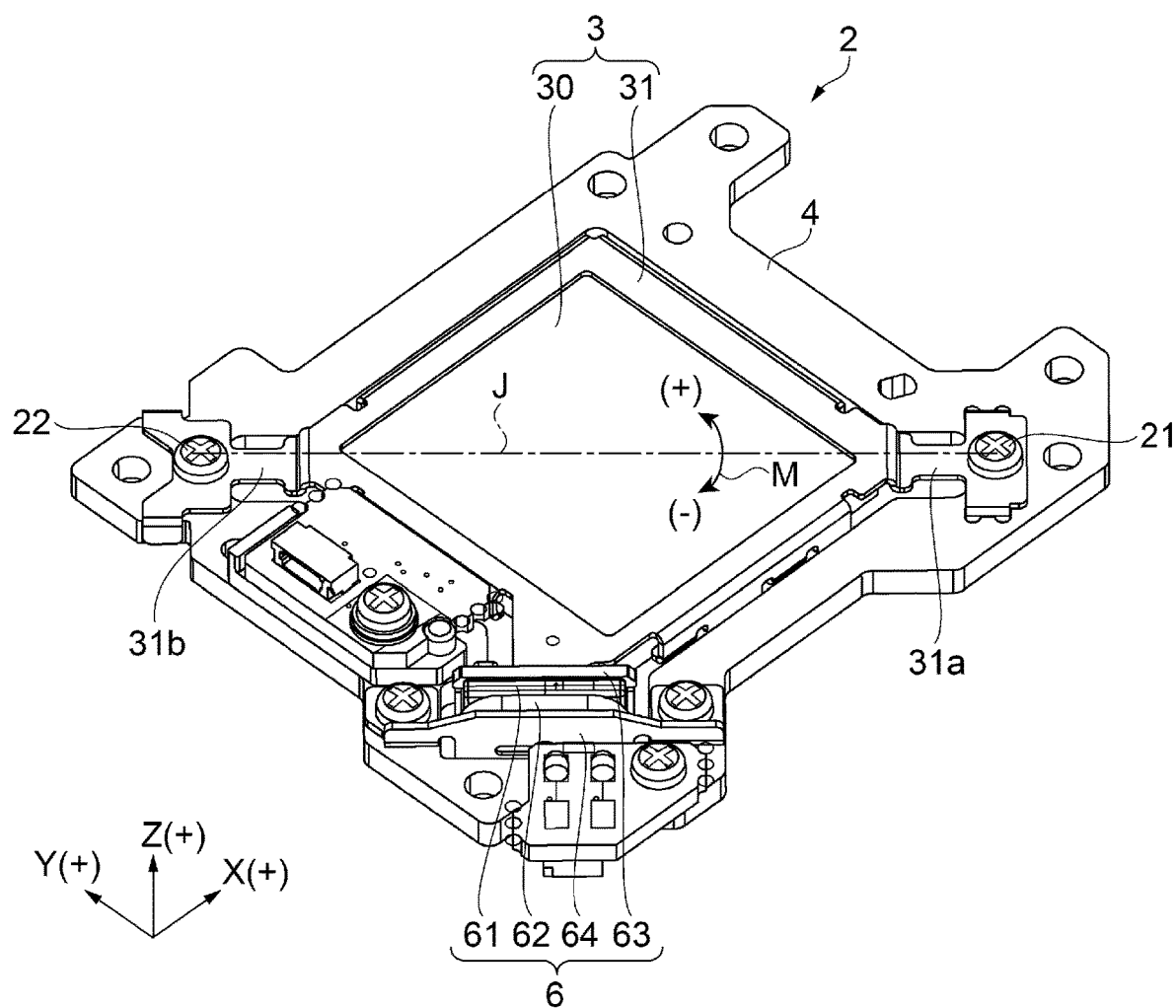
FIG. 5 is a perspective view of an optical path shifting device.

FIG. 5 is a perspective view of the optical path shifting device according to the present embodiment.

The configuration of the optical path shifting device 2 will next be described.

The optical path shifting device 2 is formed, for example, of a movable section 3, a support 4, and an actuator 6. In FIG. 5, the dichroic prism 110 (FIG. 1) is located on a side of the optical path shifting device 2 that is the side facing the positive side of the axis-Z direction, and the projection optical system 112 (FIG. 1) is located on a side of the optical path shifting device 2 that is the side facing the negative side of the axis-Z direction. In other words, the optical path shifting device 2 is so disposed that the video image light is incident on the optical path changing plate 30 of the optical path shifting device 2 from above the plane of view of FIG. 5 and exits toward the projection optical system 112 (FIG. 1), which is located on the rear side of the plane of view.

The movable section 3 is formed, for example, of the optical path changing plate 30, which serves as the optical section, and a holding frame 31, which holds the optical path changing plate 30. The optical path changing plate 30 is formed of a white sheet glass plate having a substantially square shape in a preferable example. Employing a white sheet glass plate that excels in strength allows an increase in rigidity of the movable section 3 as a whole, whereby deflection unevenness of the light deflected by the optical path changing plate 30 can be suppressed. The optical path changing plate 30 is not limited to a white sheet glass plate and may instead be made of any material having optical transparency and capable of refracting the video image light, such as borosilicate glass, quartz glass, and a variety of other glass materials. Still instead, the optical path changing plate 30 may be made of any of a variety of crystal materials, such as quartz and sapphire, or any of a variety of resin materials, such as a polycarbonate-based resin material and an acrylic resin material. The optical path changing plate 30 does not necessarily have a substantially square shape and may have any shape capable of refracting the video image light, such as an oblong shape, a rhombus shape, and an elliptical shape.

The holding frame 31 is a metal frame-shaped holding frame and supports the outer circumferential edge of the optical path changing plate 30 to accommodate the optical path changing plate 30 with the front and rear surfaces thereof exposed. In a preferable example, the holding frame 31 is made of stainless steel, and the optical path changing plate 30 is fixed to the holding frame 31 with an adhesive and integrated therewith. A first shaft 31a, which is a protruding portion in the form of a flange, is formed at one vertex portion of the holding frame 31. A screw hole is formed in the first shaft 31a, and the first shaft 31a is fixed to the support 4 with a screw 21. A second shaft 31b, which is a protruding portion similar to the first shaft 31a, is formed at a vertex portion of the holding frame 31 that is the vertex portion diagonal to the vertex portion at which first shaft 31a is formed. A screw hole is formed in the second shaft 31b, and the second shaft 31b is fixed to the support 4 with a screw 22. The holding frame 31 is not limited to a frame-shaped member that supports the entire outer circumferential edge of the optical path changing plate 30 and only needs to be a member that supports at least part of the optical path changing plate 30. The holding frame 31 corresponds to an example of the "holding section" in the present disclosure.

The support 4 is a support member made of a resin material and having a frame-like shape one-size larger than the holding frame 31. The movable section 3, the actuator 6, and other components are attached to the support 4. The movable section 3, specifically, a main body portion thereof primarily formed of the optical path changing plate 30 is accommodated in a central hole of the support 4 and attached to the support 4 via the first shaft 31a and the second shaft 31b, which protrude in the form of ear-shaped portions from diagonal portions of the movable section 3. The diagonal line that connects the first shaft 31a and the second shaft 31b to each other serves as an axis of swing motion J, and the movable section 3 can change its attitude in the pivotal direction indicated by the arrow M around the axis of swing motion J. In other words, since the movable section 3 having a substantially square shape is fixed to the support 4 along the axis of swing motion J, diagonal portions of the movable section 3 that are located on the diagonal line that intersects the axis of swing motion J are swingable around the axis of swing motion J. Therefore, the movable section 3 has a zero-inclination neutral attitude in the initial state, whereas the movable section 3 in the driven state undergoes iterative motion that causes the movable section 3 to alternately incline by a predetermined angle toward the positive side of the arrow M and a predetermined angle toward the negative side of the arrow M In the present specification, the iterative motion is also referred to as swing motion.

The actuator 6 is disposed at a diagonal portion of the support 4 that is the diagonal portion facing one of the swingable portions of the movable section 3. The actuator 6 is formed, for example, of a magnet 61, a magnet frame 63, a coil 62, and a coil frame 64. The magnet 61 and the magnet frame 63 are attached to the holding frame 31 of the movable section 3. The coil 62 and the coil frame 64 are attached to the support 4.

5) Configuration of Actuator

Figure 6:
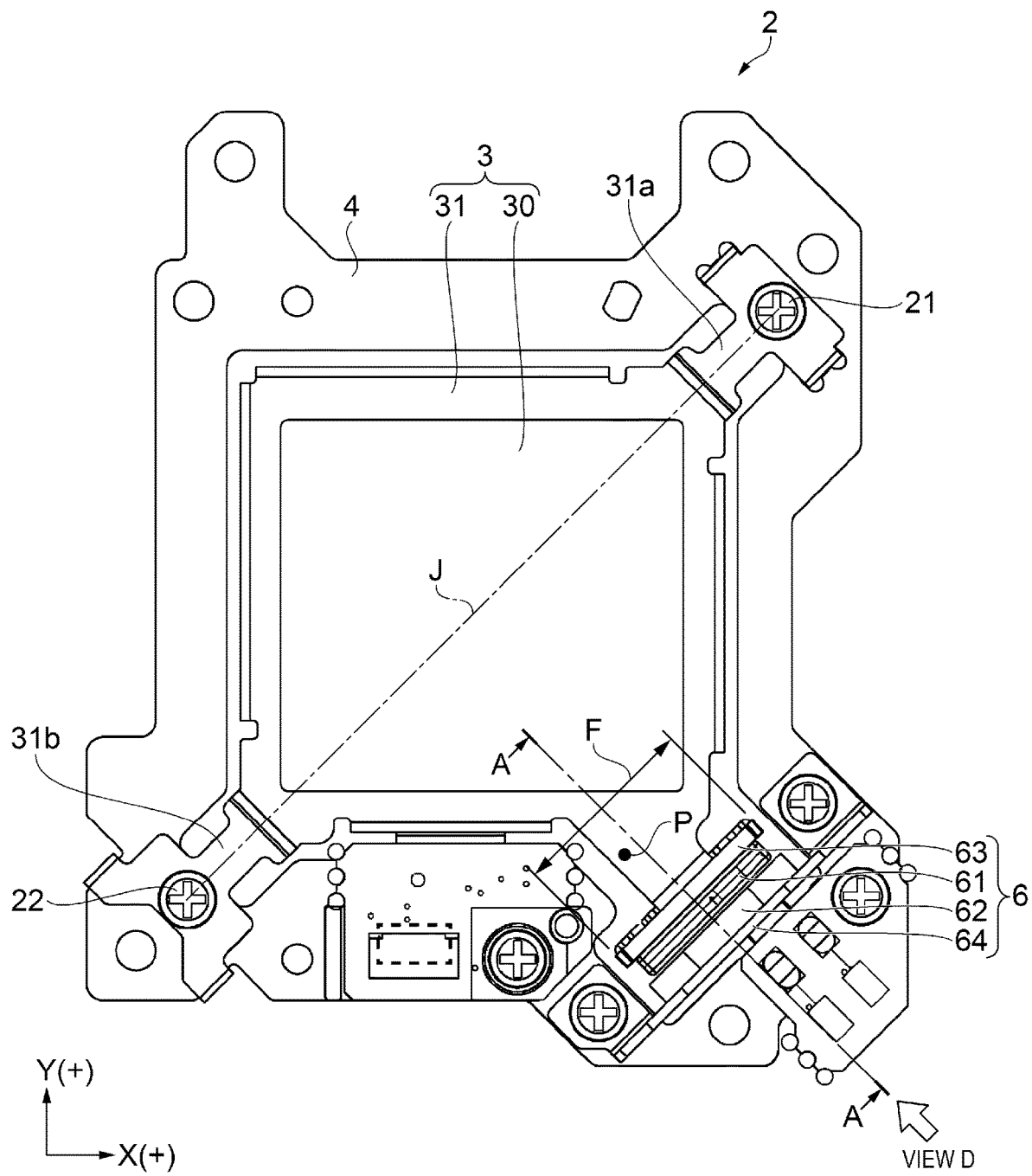
FIG. 6 is a plan view of the optical path shifting device.
Figure 7:
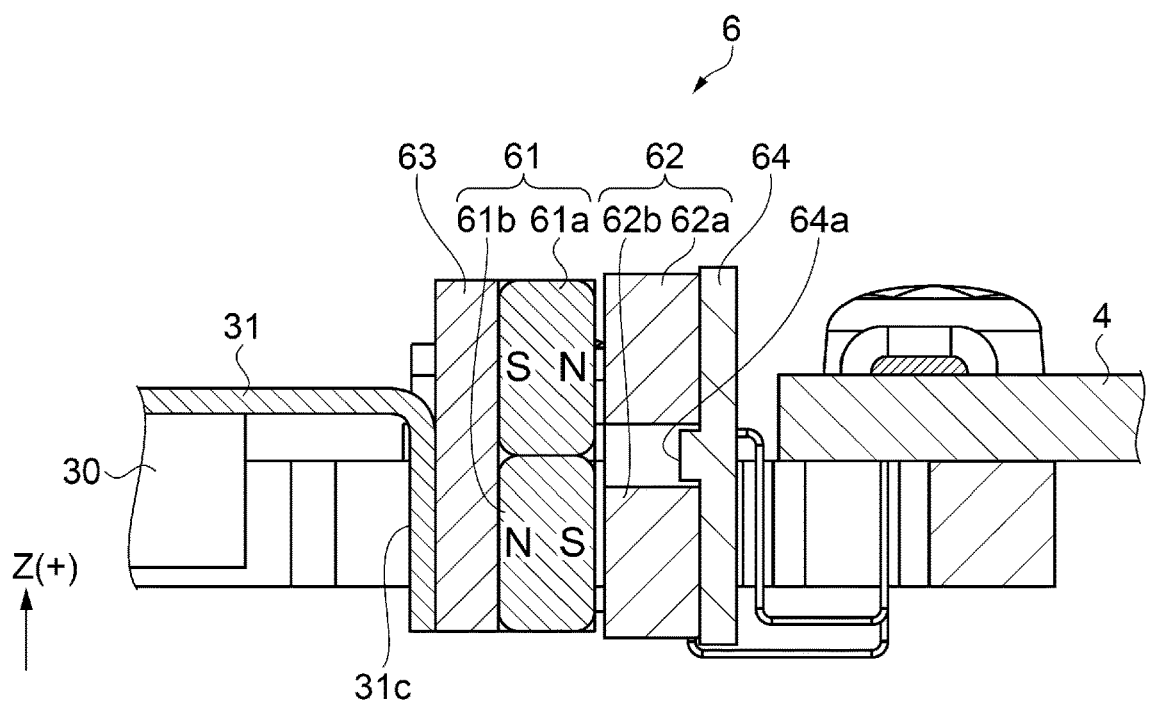
FIG. 7 is a cross-sectional view of the optical path shifting device taken along the line A-A in FIG. 6.

FIG. 6 is a plan view of the optical path shifting device. FIG. 7 is a cross-sectional view of the optical path shifting device taken along the line A-A in FIG. 6. The configuration of the actuator 6 will next be described with reference to FIGS. 6 and 7.

A vertex portion of the holding frame 31 that is the vertex portion facing the actuator 6 is folded to form an L-letter-shaped portion, which forms a flange 31c, to which the magnet frame 63 is attached, as shown in FIG. 7. The magnet frame 63 is fixed to the flange 31c. The magnet 61 is attached to the magnet frame 63. The magnet frame 63 is made of a metal, such as iron, and functions as a back yoke.

The magnet 61 is formed of a magnet 61a and a magnet 61b, which each have a rod-like shape and are stacked on each other along the axis Z. The magnet 61a is a rod-shaped magnet elongated in the depth direction in FIG. 7. The dimension F in FIG. 6 represents the length of the magnet 61a. The magnet 61a is so disposed that the north pole thereof faces the coil 62. The magnet 61b is also a rod-shaped magnet having the same length as that of the magnet 61a and is so disposed that the south pole thereof faces the coil 62. As a preferable example, the magnet 61 is a neodymium magnet. The magnet 61 is not limited to a neodymium magnet and may be any permanent magnet having intended magnetic force, such as a samarium-cobalt magnet, a ferrite magnet, or an alnico magnet.

The coil frame 64 and the coil 62 are attached in the presented order to the support 4. In detail, the coil 62 is attached to the coil frame 64, and the coil frame 64 is so fixed to the support 4 that the coil 62 faces the magnet 61 with a gap therebetween. The coil frame 64 is made of a metal, such as iron, and functions as a back yoke.

The view D in FIG. 6 represents a viewpoint from which the coil 62 is viewed along the axial direction of the windings of the coil. In the view D, the coil 62 is an air-core coil having a chamfered oblong shape. The chamfered oblong shape is also called a track shape. The longitudinal length of the coil 62 is substantially equal to the length of the magnet 61a.

A protrusion 64a, which guides the winding position of the coil 62, is formed as part of the coil frame 64, and the coil 62 is so disposed as to surround the protrusion 64a, as shown in FIG. 7. A side of the protrusion 64a that is the side facing the magnet 61 forms a hollow portion. In the initial state in which the movable section 3 does not incline, the longitudinal side 62a of the coil 62 faces the magnet 61a and the longitudinal side 62b of the coil 62 faces the magnet 61b.

In the configuration described above, when the coil 62 is energized, current flows through the coil 62 to produce a magnetic field, which causes the coil 62 to repel or attract magnets 61a and 61b, so that a vertex portion of the movable section 3 that is the vertex portion facing the magnet 61 and the vertex portion diagonal to the aforementioned vertex portion undergo reciprocating motion substantially along the axis Z, resulting in swing motion of the entire movable section 3 around the axis of swing motion J.

The present embodiment employs what is called a "moving-magnet-type configuration" in which the magnet 61 is disposed in the movable section 3. Therefore, heat generated by the energized coil 62 is not likely to be transferred to the movable section 3 or the optical path changing plate 30, whereby a change in the resonance frequency of the movable section 3, bending of the optical path changing plate 30, and other undesirable phenomena due to the heat can be suppressed.

Figure 9A:
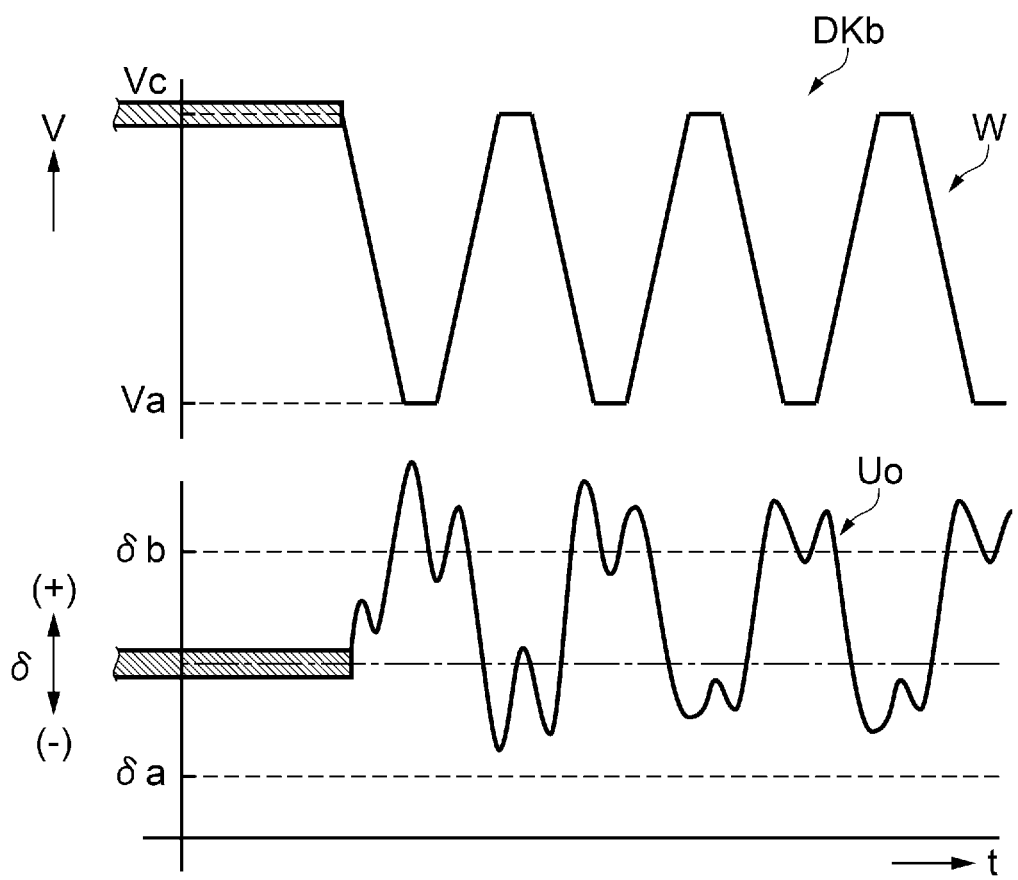
FIG. 9A shows a drive signal in related art and the resultant trajectory of the optical path shifting device.
Figure 9B:
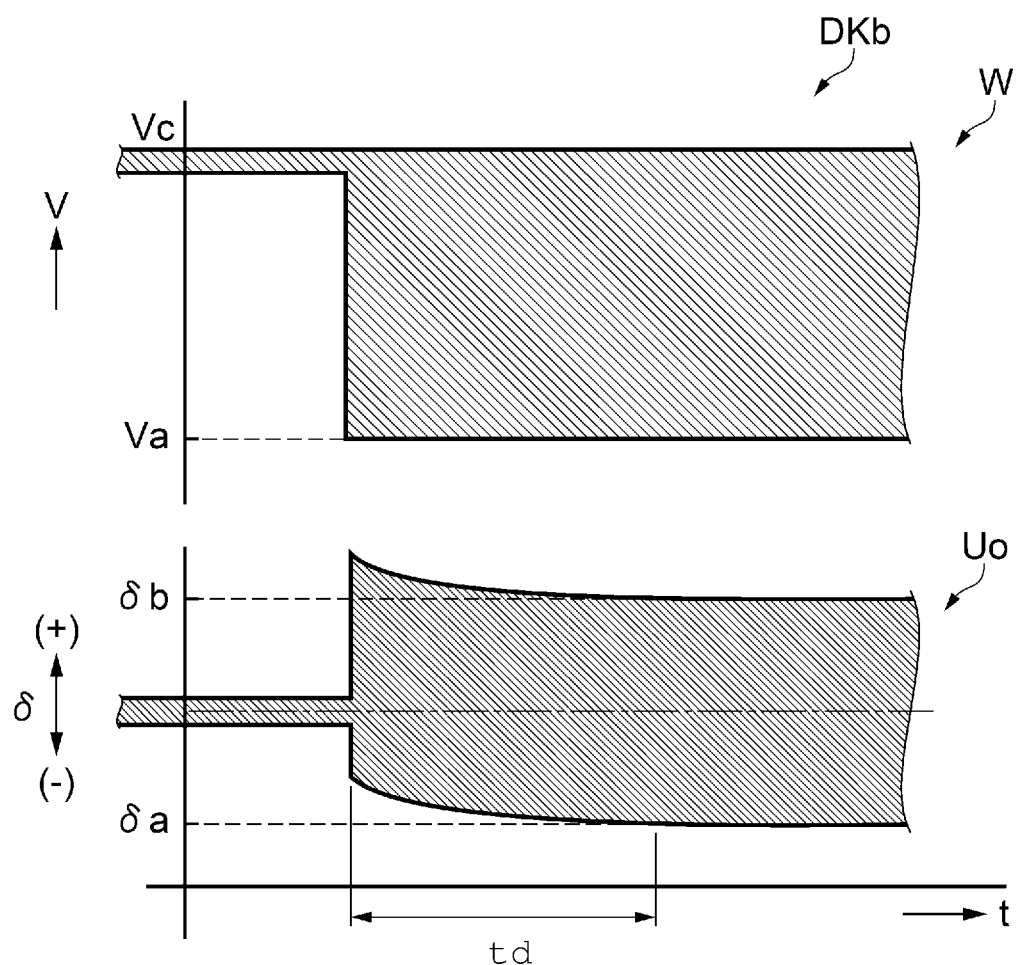
FIG. 9B is enlarged FIG. 9A with the temporal axis extended.

6) Method for Controlling Operation of Driving Optical Path Shifting Device in Related Art FIG. 9A shows the drive signal in the related art and the resultant trajectory of the optical path shifting device. FIG. 9B is enlarged FIG. 9A with the temporal axis extended.

The trajectory obtained when the optical path shifting device 2 is driven by using the drive method in the related art will be described with reference primarily to FIGS. 9A and 9B and also to FIG. 4 as appropriate. In FIG. 9A, which is a waveform diagram showing a waveform W, the horizontal axis represents time t, and the vertical axis represents voltage V.

A drive signal DKb is the drive signal in the related art. Instead of the waveform of the drive signal DS outputted from the amplifier unit 133 in FIG. 4, the drive signal DKb in FIG. 9A represents the waveform of the pre-amplification base signal outputted from the gain adjustor 132. The drive signal DKb is the combination of the signal in the period in which voltage Vc, which is reference potential, is applied and the signal in the period in which the drive signal DKb has the waveform W.

The waveform W is the waveform of a trapezoidal wave having an upper base corresponding to high-potential voltage Vc and a lower base corresponding to low-potential voltage Va. The voltage Vc corresponds to a second voltage, and the voltage Va corresponds to a third voltage. In the following description, the linear portion corresponding to each leg of the trapezoidal shape is called a leg section.

The waveform W has a leg section that falls from the voltage Vc to the voltage Va, and the voltage Va is maintained for a fixed period. The waveform W has another leg section that rises from the voltage Va to the voltage Vc, and the voltage Vc is maintained for a fixed period. The actions described above form one cycle and repeat to form the trapezoidal wave. In the drive method in the related art, the reference voltage before the waveform W is applied is the high-potential voltage Vc or the low-potential voltage Va.

The trajectory Uo in FIG. 9A represents trajectory data on the amplitude of a measurement point P (FIG. 6) on the movable section 3 measured along the temporal axis with a laser displacement gauge when the optical path shifting device 2 is driven to cause the movable section 3 to swing. The vertical axis of FIG. 9A showing the trajectory Uo represents a displacement width δ.

An ideal trajectory Uo is the trajectory of the reversed-phase trapezoidal wave having the waveform W. Since the optical path shifting device 2 is an apparatus that iteratively moves the optical path changing plate 30, as described above, it is desirable to achieve a trapezoidal trajectory between a positive displacement width δb and a negative displacement width δa.

In contrast, the trajectory Uo of the movable section 3 exceeds the positive displacement width δb. On the other hand, the trajectory Uo does not reach the negative displacement width δa, and the entire waveform is shifted toward the positive side. Further, waviness formed of overshoots and undershoots is observed in the portions of the trajectory that correspond to the upper and lower bases of the trapezoidal shape.

FIG. 9B show the graphs in FIG. 9A with the temporal axis extended and show the result of macro measurement of the situation of the rising edge after the drive operation starts. The waveform W and the trajectory Uo are the same as those in FIG. 9A.

The trajectory Uo in FIG. 9B shows that the entire waveform is shifted toward the positive side for a period td immediately after the rising edge. In detail, the waveform greatly exceeds the displacement width δb toward the positive side immediately after the rising edge and then gradually approaches the displacement width δb as the time elapses. On the other hand, the waveform on the negative side does not reach the displacement width δa immediately after the rising edge but similarly approaches the displacement width δa as the time elapses. When the period td elapses, the trajectory Uo falls within the range between the displacement width δa and the displacement width δb, which means that the drive operation is stabilized. A result of an experiment conducted by the present inventors shows that the period td is about 2 seconds. That is, in the drive method in the related art, the trajectory is disturbed by an amount recognizable by human vision.

Figure 8A:
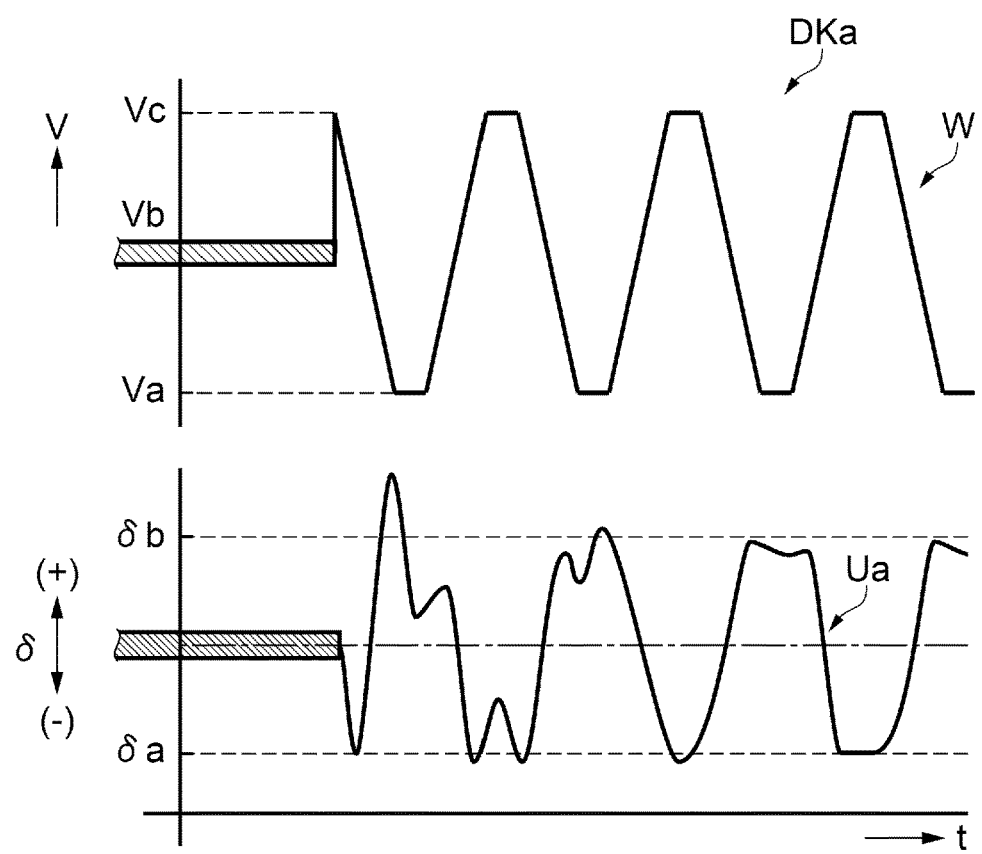
FIG. 8A shows a drive signal and the resultant trajectory of the optical path shifting device.
Figure 8B:
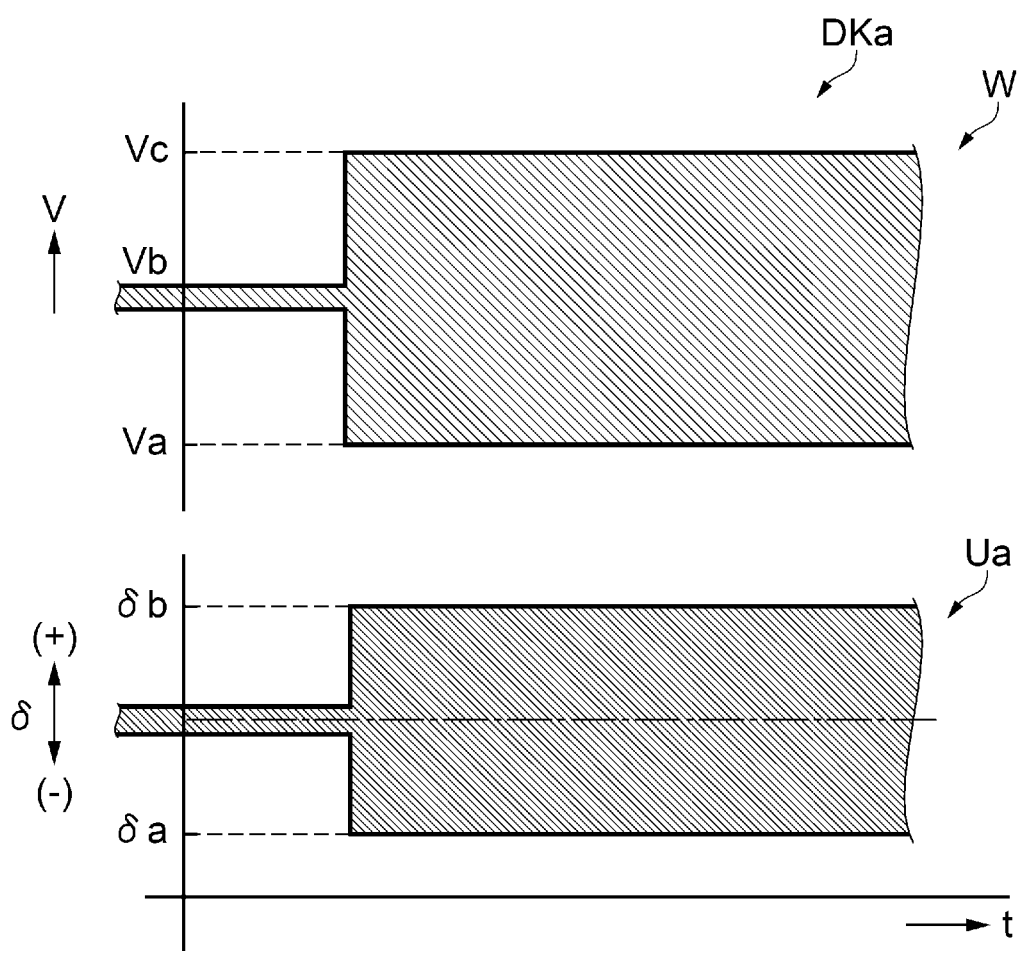
FIG. 8B is enlarged FIG. 8A with the temporal axis extended.

7) Method for Controlling Operation of Driving Optical Path Shifting Device According to Present Embodiment FIG. 8A shows the drive signal according to the present embodiment and the resultant trajectory of the optical path shifting device, and FIG. 8A corresponds to FIG. 9A. FIG. 8B is enlarged FIG. 8A with the temporal axis extended, and FIG. 8B corresponds to FIG. 9B. The vertical and horizontal axes of FIGS. 8A and 8B have the same units as those in FIG. 9A.

A characteristic drive method according to the present embodiment will be described with reference primarily to FIGS. 8A and 8B and also to FIGS. 9A and 9B as appropriate.

The waveform W in FIG. 8A is the waveform of the trapezoidal wave equal to the waveform W in FIG. 9A. The drive method according to the present embodiment differs from the related-art drive method in FIG. 9A in that the reference voltage before the waveform W is applied is voltage Vb, which is intermediate potential. The voltage Vb as first voltage is intermediate voltage between the low-potential voltage Va and the high-potential voltage Vc. That is, the drive signal DKa according to the present embodiment is the combination of the signal in the period in which the voltage Vb, which is the intermediate potential serving as the reference voltage, is applied and the signal in the period in which the drive signal DKa has the waveform W. Further, the period for which the voltage Vb, which is the intermediate potential, is applied as a first period is at least three times the time constant T. The minimum voltage in the drive signal DKa is the voltage Va, and the maximum voltage in the drive signal DKa is the voltage Vc.

In a trajectory Ua of the movable section 3 provided by the drive method according to the present embodiment, waviness formed of overshoots and undershoots is observed in the portions corresponding to the upper and lower bases of the trapezoidal shape in the first one cycle, but the trajectory in the following cycles has a substantially trapezoidal waveform, as shown in FIG. 8A. The disturbance of the trajectory in about one cycle only lasts for a very short period, and the disturbance is difficult for human vision to recognize and therefore tolerable. For example, when the frequency of the waveform W is 60 Hz, one cycle of about 16.7 ms is short, and it is therefore difficult to recognize the disturbance. Further, the trajectory Ua in the second cycle and thereafter substantially falls within the range between the displacement width δa and displacement width δb. A large improvement in the trajectory is achieved as compared with the related-art trajectory Uo (FIG. 9A), which has a waveform entirely shifted toward the positive side. The graphs in FIG. 8B, in which the temporal axis is extended, show the noticeable improvement and therefore show that the trajectory Ua of the movable section 3 achieved by the drive method according to the present embodiment follows substantially ideal iterative motion between the displacement width δa and displacement width δb.

As described above, the drive method using the drive signal DKa according to the present embodiment allows the disturbance of the trajectory to be greatly improved as compared with the drive method using the drive signal DKb in the related art. Before the reason for this is described, the reason why the drive signal DKb in the related art causes the disturbance of the trajectory will first be described.

The drive signal DKb in the related art uses the high-potential voltage Vc as the reference voltage, as described above. The drive signal DKb is applied to the coupling capacitor C, as shown in FIG. 4. In this process, since the voltage Vc, which is the DC component, is first applied to the capacitor C, the potential across the capacitor C is biased by the voltage Vc, which is the DC component.

The waveform W of the trapezoidal wave is subsequently applied, but the influence of the DC bias is undesirably left before the potential across the capacitor C is stabilized at the intermediate potential of the trapezoidal wave. In this transient response period, the DC bias is applied also to the drive signal DS amplified by the amplifier unit 133. The entire waveform is therefore shifted toward the positive side for the period td immediately after the rising edge, as indicated by the trajectory Uo in FIG. 9B. The period td required for the transient response is about three times the time constant τ determined by the capacitor C and the composite resistance Rx. The composite resistance Rx is the combination of the resistance R and the input impedance of the operational amplifier OP, as described above.

In contrast, since the drive signal DKa according to the present embodiment uses the voltage Vb, which is the intermediate potential, as the reference voltage, the potential across the capacitor C is the stable intermediate potential. Since the intermediate potential of the waveform W of the subsequently applied trapezoidal wave is also the voltage Vb, a substantially ideal iterative drive operation is achieved with no influence of DC bias. Further, since the period for which the voltage Vb, which is the intermediate potential, is applied is at least three times the time constant τ, the potential across the capacitor C can be more reliably stabilized at the intermediate potential.

As described above, the optical path shifting device 2 and the method for controlling the optical path shifting device 2 according to the present embodiment can provide the following effects.

The control circuit 120 uses the drive circuit 122 to control the operation of driving optical path shifting device 2. In detail, the drive circuit 122 applies the voltage Vb, which is the intermediate potential, as the reference voltage and then uses the drive signal DKa, which applies the trapezoidal wave having the waveform W. Therefore, the potential across the capacitor C is stabilized in advance at the voltage Vb, which is equal to the intermediate potential of the waveform W, and the optical path shifting device 2 is then driven in accordance with the waveform W of the trapezoidal wave, whereby the movable section 3 can be driven and controlled along a substantially ideal trajectory, unlike the related-art drive/control method, in which the DC bias causes disturbance of the trajectory.

A drive signal that achieves a more ideal trajectory than the trajectory provided by the control method using the related-art drive signal and a drive/control method that excels the related-art control method can therefore be provided.

Further, since the period for which the voltage Vb, which is the intermediate potential, is applied is at least three times the time constant τ, the potential across the capacitor C can be more reliably stabilized at the intermediate potential before applying the waveform W of the trapezoidal wave.

The present disclosure is not limited to the embodiment describe above, and a variety of changes, improvements, and other modifications can be made to the embodiment described above. Variations will be described below.

Variation 1

Variation 1 will be described with reference to FIG. 8A.

The aforementioned embodiment has been described as the preferable example with reference to the case where the voltage Vb, which is the intermediate potential, is applied before the waveform W of the trapezoidal wave is applied, but not necessarily, and the voltage Vb, which is the intermediate potential, may be applied after the operation of driving the optical path shifting device 2 is completed or even in a drive standby state in which the optical path shifting device 2 is ready to be driven. For example, after one video image projection action is completed and the operation of driving the optical path shifting device 2 is completed, it is unknown when the next video image projection action starts. Therefore, keeping the application of the voltage Vb, which is the intermediate potential, even after the drive operation is completed allows the optical path shifting device 2 to be instantly driven in a stable manner. The same holds true for the drive standby state. It is therefore preferable to keep applying the voltage Vb, which is the intermediate potential, as the reference voltage as long as the projector 1 is in operation.

Variation 2

The aforementioned embodiment has been described with reference to the case where the drive signal DKa is used to drive the optical path shifting device 2, but the drive signal DKa is not necessarily used to drive the optical path shifting device 2. The drive method may be applied to a device and apparatus that undergo iterative motion. The drive method is suitable particularly for a device and apparatus having a circuit configuration for signal transmission via a coupling capacitor. Even when the drive method according to the present application is applied to such a device and apparatus, intended iterative motion can be performed with no influence of DC bias.

Variation 3

The aforementioned embodiment has been described with reference to the case where the waveform of a trapezoidal wave is used as the waveform W, but the waveform. W may instead be a waveform that periodically applies maximum voltage and minimum voltage. For example, the waveform of a sinusoidal wave or a triangular wave may be used as the waveform W.

Variation 4

The aforementioned embodiment has been described with reference to the case where the period for which the voltage Vb, which is the intermediate potential, is applied is at least three times the time constant τ to more reliably stabilize the potential across the capacitor C at the intermediate potential, but the period for which the voltage Vb, which is the intermediate potential, is applied may be about two times the time constant T.

Variation 5

The aforementioned embodiment has been described with reference to the case where the optical path changing plate 30 of the optical path shifting device 2 is made of glass having light transparency, but the material is not limited to glass, and a mirror having light reflectivity may instead be used. In this case, the optical device according to the embodiment can be used also as an optical device for optical scanning, an optical switch, an optical attenuator, and other devices.

Variation 6

The aforementioned embodiment has been described with reference to the configuration in which the spatial light modulator is formed of transmissive liquid crystal display elements, but the spatial light modulator may instead be formed of reflective liquid crystal display elements, such as a liquid-crystal-on-silicon (LCOS) device (LCoS is registered trademark), or a digital micromirror device (DMD). Further, the image display apparatus is not limited to a projector and may instead be a head mounted display (HMD) or a head-up display (HUD).

Contents derived from the embodiment will be described below.

A method for controlling an optical device according to the present application is a method for controlling an optical device including a movable section including an optical section that refracts incident video image light in accordance with the angle of incidence of the video image light and outputs the refracted video image light and a holding section that supports the optical section, an actuator that causes the movable section to swing, and a drive circuit that applies a drive signal to the actuator via a coupling capacitor and an amplifier, the method including applying first voltage to the actuator for a first period and then periodically applying second voltage and third voltage to the actuator to cause the movable section to swing. The second voltage is the maximum of the voltage applied during causing the movable section to swing. The third voltage is the minimum of the voltage applied during causing the movable section to swing. The first voltage is intermediate voltage between the second voltage and the third voltage.

According to the control method described above, the voltage Vb, which is the intermediate potential, is applied as the reference voltage, and a trapezoidal wave having the waveform W is then applied. Therefore, the potential across the capacitor C is stabilized in advance at the voltage Vb, which is equal to the intermediate potential of the waveform W, and the optical path shifting device 2 is then driven in accordance with the waveform W of the trapezoidal wave, whereby the movable section 3 can be driven and controlled along a substantially ideal trajectory, unlike the related-art drive/control method, in which the DC bias causes the operation of the movable section 3 to be biased.

A drive signal that achieves a more ideal trajectory than the trajectory provided by the control method using the related-art drive signal and a drive/control method that excels the related-art control method can therefore be provided.

In the control method described above, the first period may be at least three times a time constant τ, where τ is the time constant determined by the capacity of the coupling capacitor and resistance including the input impedance of the amplifier.

The potential across the capacitor C can thus be more adequately stabilized at the intermediate potential before the waveform W of the trapezoidal wave is applied.

In the control method described above, the first voltage may be applied to the actuator after the operation of driving the actuator based on the drive signal is completed or in a drive standby state in which the actuator is ready to be driven.

The signal waveform periodically applied to the actuator may be the waveform of a trapezoidal wave having an upper base corresponding to the second voltage and a lower base corresponding to the third voltage.

The configuration described above, in which the voltage Vb, which is the intermediate potential, is applied even after the drive operation is completed or in the drive standby state, allows the optical path shifting device 2 to be instantly driven in a stable manner.

An optical device according to the present application includes a movable section including an optical section that refracts incident video image light in accordance with an angle of incidence of the video image light and outputs the refracted video image light and a holding section that supports the optical section, an actuator that causes the movable section to swing, and a drive circuit that applies a drive signal to the actuator. The drive circuit applies the drive signal to the actuator via a coupling capacitor and an amplifier. The drive circuit applies first voltage to the actuator for a first period and then periodically applies second voltage and third voltage to the actuator to cause the movable section to swing. The second voltage is the maximum of the voltage applied during causing the movable section to swing. The third voltage is the minimum of the voltage applied during causing the movable section to swing. The first voltage is intermediate voltage between the second voltage and the third voltage.

The control circuit 120 uses the drive circuit 122 to control the operation of driving optical path shifting device 2. In detail, the drive circuit 122 applies the voltage Vb, which is the intermediate potential, as the reference voltage and then uses the drive signal DKa, which applies the trapezoidal wave having the waveform W. Therefore, the potential across the capacitor C is stabilized in advance at the voltage Vb, which is equal to the intermediate potential of the waveform W, and the optical path shifting device 2 is then driven in accordance with the waveform W of the trapezoidal wave, whereby the movable section 3 can be driven and controlled along a substantially ideal trajectory, unlike the related-art drive/control method, in which the DC bias causes disturbance of the trajectory.

An optical path shifting device 2 that achieves a more ideal trajectory than the trajectory provided by the control method using the optical path shifting device in the related art can therefore be provided.

An image display apparatus according to the present application includes the optical device described above and a projection optical system that enlarges and projects the video image light outputted from the optical device.

The projector 1 includes the optical path shifting device 2 and the projection optical system 112. The projector 1 further includes the control circuit 120 and the drive circuit 112, which control and drive the optical path shifting device 2. A projector 1 capable of producing a high-definition projection image having a stable image quality, instead of the related-art image display apparatus, which causes the trajectory to be disturbed by an amount recognizable by human vision, can therefore be provided.

What is claimed is:

1. A method for controlling an optical device including a movable section including an optical section that refracts incident video image light in accordance with an angle of incidence of the video image light and outputs the refracted video image light and a holding section that supports the optical section, an actuator that causes the movable section to swing, and a drive circuit that applies a drive signal to the actuator via a coupling capacitor and an amplifier, the method comprising:

applying first voltage to the actuator for a first period and then periodically applying second voltage and third voltage to the actuator to cause the movable section to swing, wherein the second voltage is a maximum of the voltage applied during causing the movable section to swing, the third voltage is a minimum of the voltage applied during causing the movable section to swing, and the first voltage is intermediate voltage between the second voltage and the third voltage.

2. The method for controlling an optical device according to claim 1, wherein the first period is at least three times a time constant $\tau$, where $\tau$ is a time constant determined by a capacity of the coupling capacitor and resistance including input impedance of the amplifier.

3. The method for controlling an optical device according to claim 1, wherein the first voltage is applied to the actuator after the operation of driving the actuator based on the drive signal is completed or in a drive standby state in which the actuator is ready to be driven.

4. The method for controlling an optical device according to claim 1, wherein a signal waveform periodically applied to the actuator is a waveform of a trapezoidal wave having an upper base corresponding to the second voltage and a lower base corresponding to the third voltage.

5. An optical device comprising:
  a movable section including an optical section that refracts incident video image light in accordance with an angle of incidence of the video image light and outputs the refracted video image light and a holding section that supports the optical section;
  an actuator that causes the movable section to swing; and
  a drive circuit that applies a drive signal to the actuator,
  wherein the drive circuit applies the drive signal to the actuator via a coupling capacitor and an amplifier,
  the drive circuit applies first voltage to the actuator for a first period and then periodically applies second voltage and third voltage to the actuator to cause the movable section to swing,
  the second voltage is a maximum of the voltage applied during causing the movable section to swing,
  the third voltage is a minimum of the voltage applied during causing the movable section to swing, and
  the first voltage is intermediate voltage between the second voltage and the third voltage.

6. An image display apparatus comprising:
  the optical device according to claim 5; and
  a projection optical system that enlarges and projects the video image light outputted from the optical device.

* * * * *